US012646638B2

(12) United States Patent
Laliberte et al.

(10) Patent No.: US 12,646,638 B2
(45) Date of Patent: Jun. 2, 2026

(54) RAPID HARNESS FABRICATION SYSTEMS AND METHODS

(71) Applicant: Textron Innovations Inc., Providence, RI (US)

(72) Inventors: Frederic Laliberte, Mascouche (CA); Cinthia Poudrier, St-Hippolyte (CA)

(73) Assignee: Textron Innovations Inc., Providence, RI (US)

( * ) Notice: Subject to any disclaimer, the term of this patent is extended or adjusted under 35 U.S.C. 154(b) by 479 days.

(21) Appl. No.: 18/060,005

(22) Filed: Nov. 30, 2022

(65) Prior Publication Data

US 2024/0177890 A1 May 30, 2024

(51) Int. Cl.
*H01B 13/012* (2006.01)

(52) U.S. Cl.
CPC .............................. *H01B 13/01227* (2013.01)

(58) Field of Classification Search
CPC ................................................ H01B 13/01227
See application file for complete search history.

(56) References Cited

U.S. PATENT DOCUMENTS

| | | | | |
|---|---|---|---|---|
| 5,127,062 | A | 6/1992 | Cerda | |
| 8,704,623 | B2 | 4/2014 | Dumonski | |
| 2008/0200040 | A1 | 8/2008 | Dumonski | |
| 2015/0161781 | A1* | 6/2015 | Philbert | G06F 30/00 382/141 |
| 2016/0064121 | A1* | 3/2016 | Rougier | H01B 13/01236 29/748 |
| 2018/0053584 | A1* | 2/2018 | Coviello | H01B 13/01245 |

(Continued)

FOREIGN PATENT DOCUMENTS

| | | | | |
|---|---|---|---|---|
| CN | 106298085 | A * | 1/2017 | H01B 13/01227 |
| CN | 111941344 | A * | 11/2020 | B25B 27/00 |
| JP | 410283856 | A | 10/1998 | |

(Continued)

OTHER PUBLICATIONS

European Patent Office, "European Search Report," EP Application No. 23 200 217.0-1201, Mar. 15, 2024, 4 pages, published Munich, Germany.

(Continued)

*Primary Examiner* — Jeffrey T Carley
*Assistant Examiner* — Jose K Abraham
(74) *Attorney, Agent, or Firm* — Fogarty LLP

(57) ABSTRACT

Rapid harness fabrication uses pins having a positioning head, which may include (define) a paper punch end and a magnetic collar disposed between the positioning head and a shaft of the pin. A perforated metal board may have a sheet of perforable material (paper) disposed over it and the magnetic pins may be located in a harness configuration on the sheet by punching the positioning head of each of the pins through the sheet with the collar magnetically engaging the metal board. Harness components may be routed and/or disposed in the harness configuration, with the pins holding the harness components in the harness configuration. Stops secured to distal ends of pin shafts may retain a harness component in the harness configuration. The harness configuration may be projected on the sheet. at a one-to-one scale, by (a) system projector(s) and/or the harness routing may be printed on the sheet.

11 Claims, 8 Drawing Sheets

(56) References Cited

U.S. PATENT DOCUMENTS

| | | | | |
|---|---|---|---|---|
| 2019/0186654 | A1* | 6/2019 | Blacken .................... | F16L 3/12 |
| 2021/0110952 | A1* | 4/2021 | Brown ............. | H01B 13/01236 |

FOREIGN PATENT DOCUMENTS

| | | | | | |
|---|---|---|---|---|---|
| KR | 200357920 | Y1 * | 7/2004 | ............. | B25B 11/02 |
| KR | 200426811 | Y1 * | 9/2006 | ............. | B25B 11/02 |
| WO | WO-03031094 | A1 * | 4/2003 | ....... | H01B 13/01227 |

OTHER PUBLICATIONS

European Patent Office, "Communication pursuant to Article 94(3) EPC ," EP Application No. 23 200 217.0-1201, Mar. 27, 2024, 16 pages, published Ryswick, Netherlands.

* cited by examiner

RAPID HARNESS FABRICATION SYSTEMS AND METHODS

TECHNICAL FIELD

The present disclosure relates generally to wiring or other harnesses, and more particularly to rapid harness fabrication systems and methods, and specifically to embodiments of rapid wiring harness fabrication systems and methods.

BACKGROUND

Typically, in production, an operator uses heavy plywood boards, or the like, to fabricate harnesses, such as electrical harnesses. The operator builds the harness based on drawings that are attached to the plywood harness board. These boards typically weigh approximately 80 pounds, and are fabricated by a tooling department, or the like, with permanent studs or other attachments (comprising screws with nuts, nails or similar fasteners) mechanically fastened in appropriate locations on the plywood board. Production of the harness must await the manufacture of the board(s) before harness fabrication can start. In production, the attachments are used to form and secure a wiring harness as it is being built. When a harness is completed, it is removed from the harness board.

Thereafter, the current board is stored to clear the working space and another one is installed in place for the next harness to be produced. Several manipulations and boards storage is required to support this process. Manipulation of theses board present a high risk of injury. Additionally, the boards need to be stored, often with the attachments still in place, until the end of the life of the aircraft, which represent many years of storage and significant square footage. Alternatively, the lifespan of harness boards may be shortened, if the mechanically attached parts are repeatedly removed for board storage, and then reattached for reuse of the board.

During the development phases of a project, the boards typically need to be reworked to incorporate engineering changes. During those phases, the configuration of the harness often changes drastically meaning that the board(s) need(s) to be reworked completely to match the engineering modifications. Again, further development of the harness must await manufacturing of the board(s).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide rapid harness fabrication using harness fabrication pins that have a positioning head and a magnetic collar, the magnetic collar disposed between the positioning head and a shaft of the pin. Each pin may include (in larger pins) a stop secured to a distal end of the shaft from the positioning head and magnetic collar. Also, the positioning head of each magnetic pin may include (e.g., define) a paper punch end.

In accordance therewith, a rapid harness fabrication system or method may employ a perforated metal board and a plurality of the magnetic pins, such as with a sheet of perforable material (e.g., paper) disposed over at least a portion of the perforated metal board. Wherein, the magnetic pins are located in a harness configuration on the sheet of perforable material by punching the positioning head of each of the magnet pins through the sheet of perforable material. The magnetic collar disposed between the positioning head and a shaft of the pin may thereby magnetically engage the perforated metal board (through the sheet disposed thereupon). Whereupon, harness components may be routed and/or disposed in the harness configuration, with the pins holding the harness components in the harness configuration. Also, stops secured to distal ends of the shaft from the positioning head and magnetic collar on some (larger) pins may retain a harness component in the harness configuration.

Some implementations of the present systems and methods may include projecting the harness configuration on the perforable material disposed on the perforated Metal board (at a one-to-one scale) for routing and/or disposing the harness components in the harness configuration. In such implementations, the systems and methods may include one or more projectors that may project the wiring harness routing onto the perforable material disposed on the perforated metal board, such as at a one-to-one scale. For example, the projector(s) may be disposed above, below or to one side of the perforated metal board, and the projector(s) may correct for parallax, to project the wiring harness routing on the perforable material disposed on the perforated metal board at the one-to-one scale. Further, in such implementations, the projector, or a computer system coupled to the projector, may include (a) processor(s) and a memory coupled to the processor(s), with program instructions stored thereon that, upon execution by the processor(s) cause the projector to project the wiring harness routing on the perforable material disposed over the perforated metal board at a one-to-one scale. For example, the program instructions may cause the projector and/or the computer system to correct for parallax, to project the wiring harness routing on the perforable material disposed on the perforated metal board at the one-to-one scale.

Alternatively, or additionally, the sheet of perforable material disposed on the perforated metal board further may include harness routing printed thereon.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In various embodiments, one or more systems may each include at least one processor and memory coupled to the processors, wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
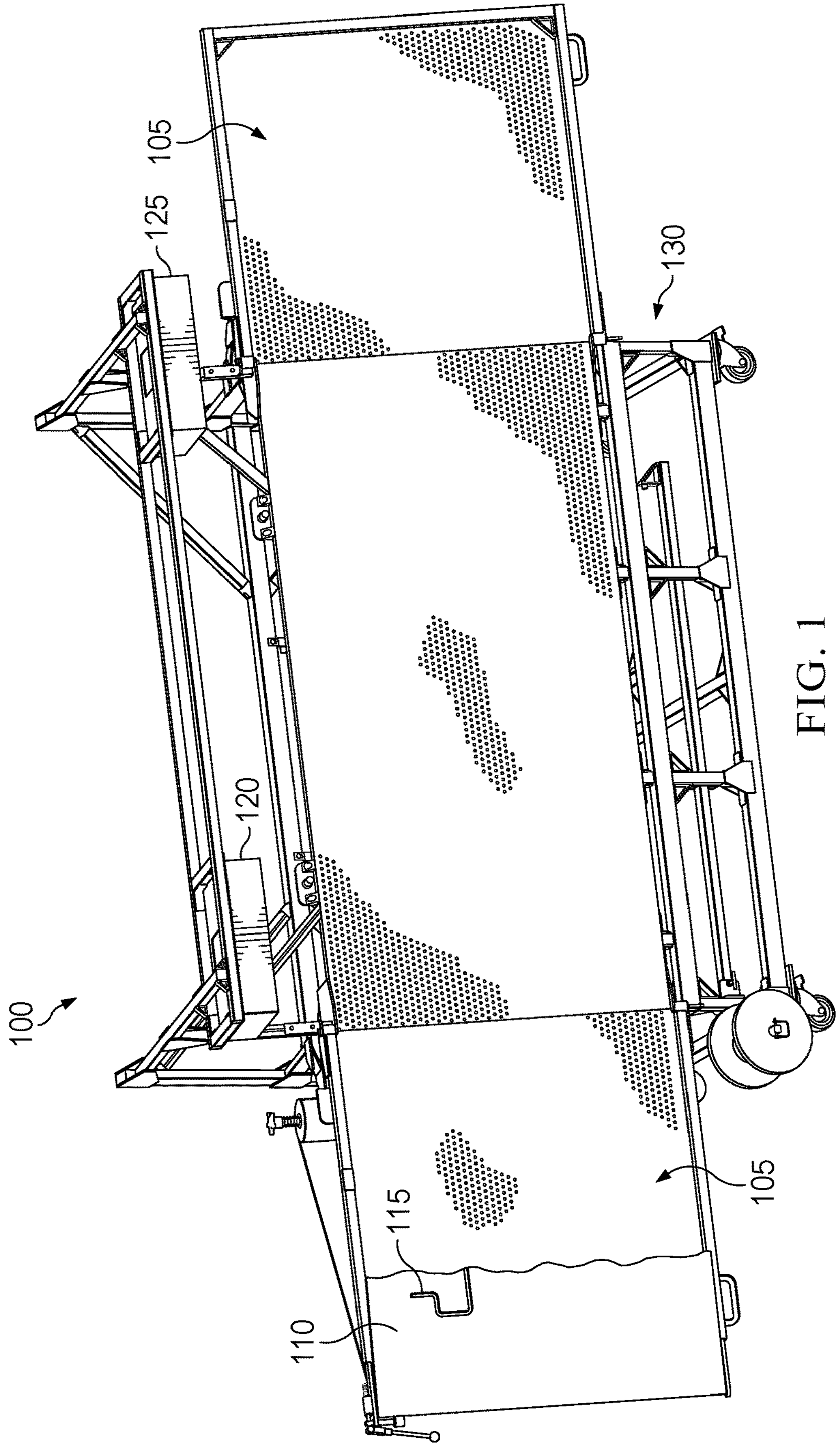
Figure 2:
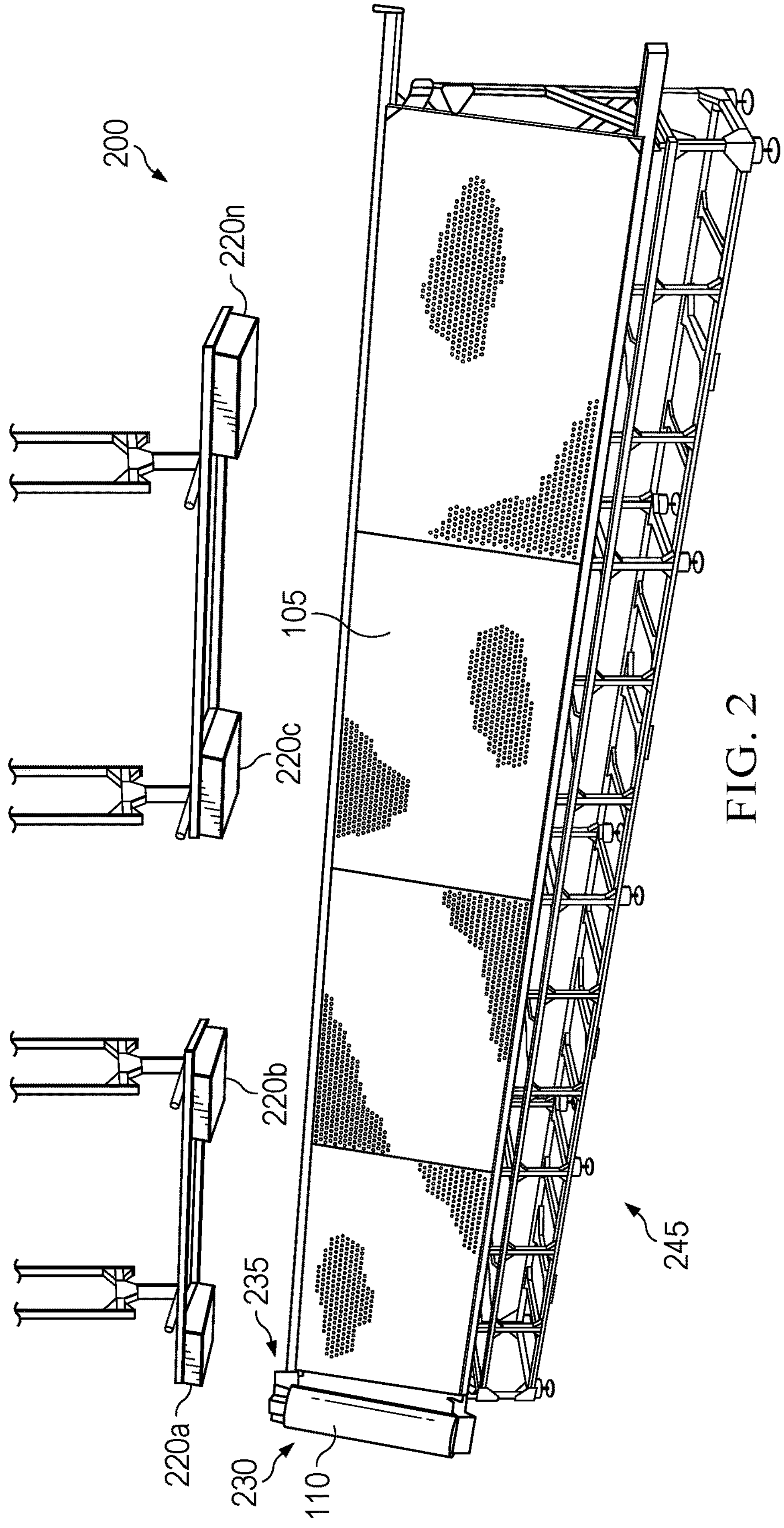
Figure 3:
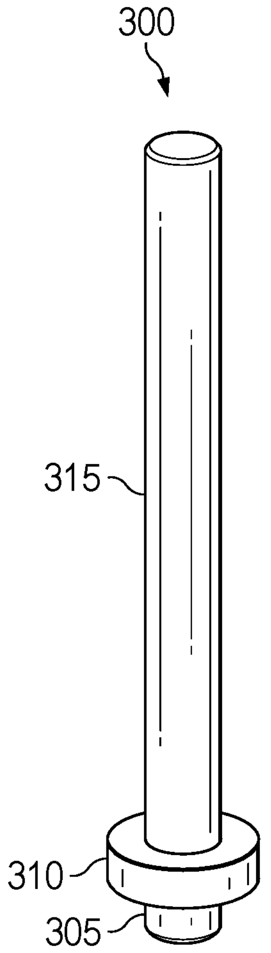
Figure 4:
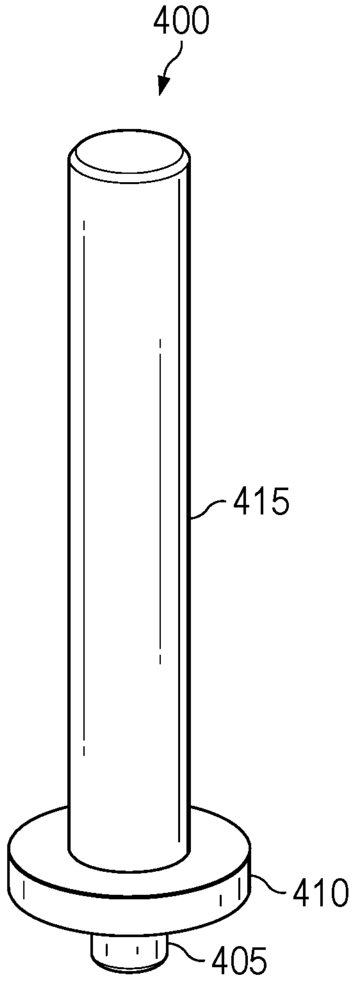
Figure 5:
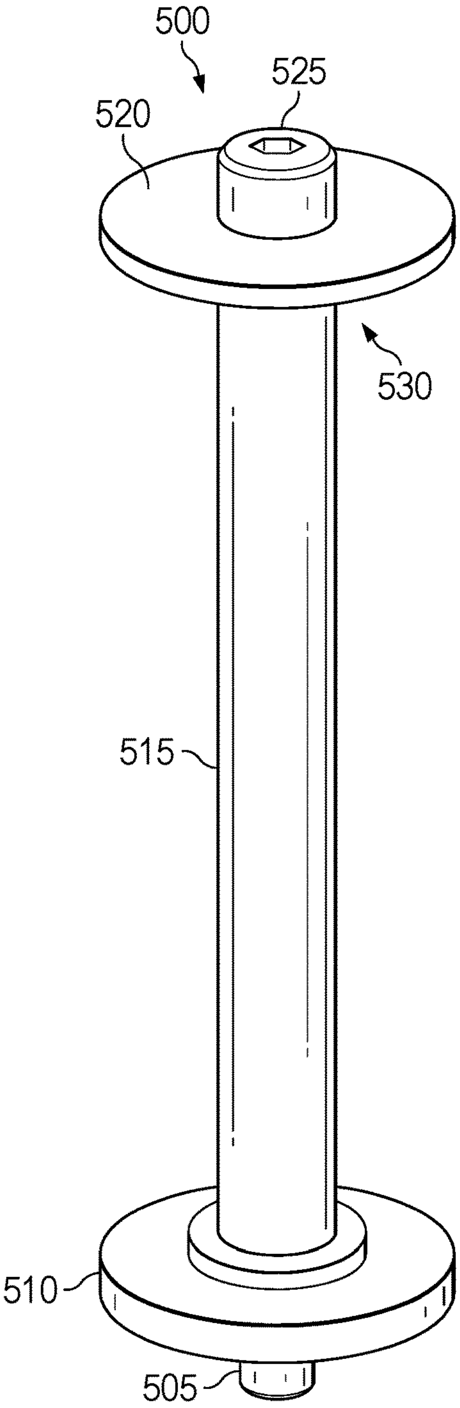
Figure 7:
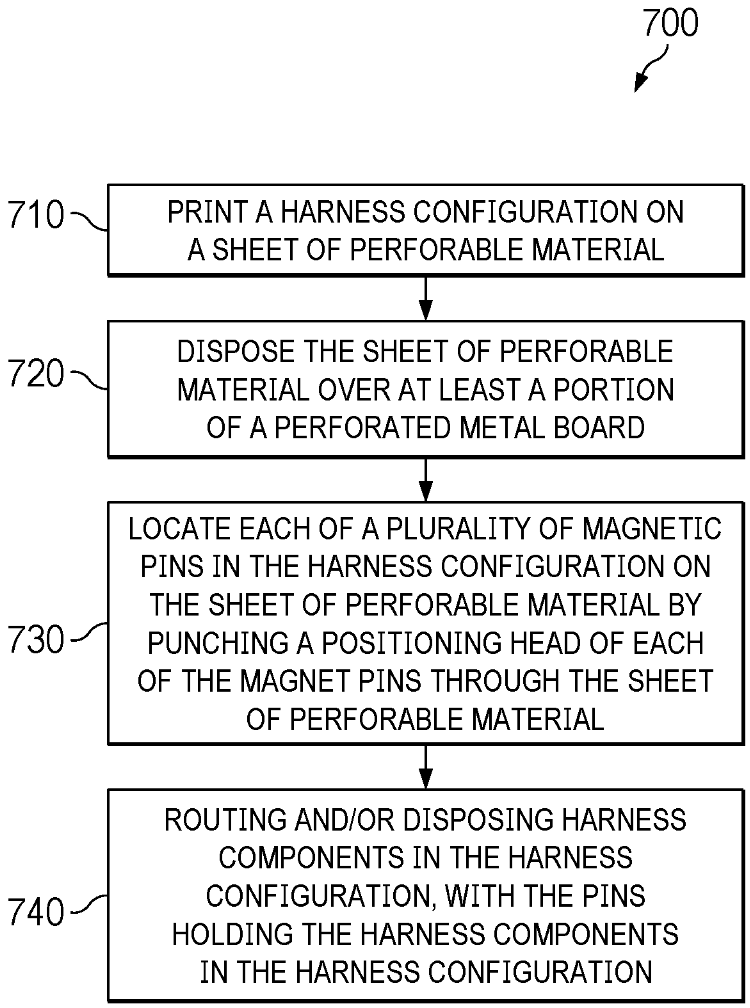
Figure 8:
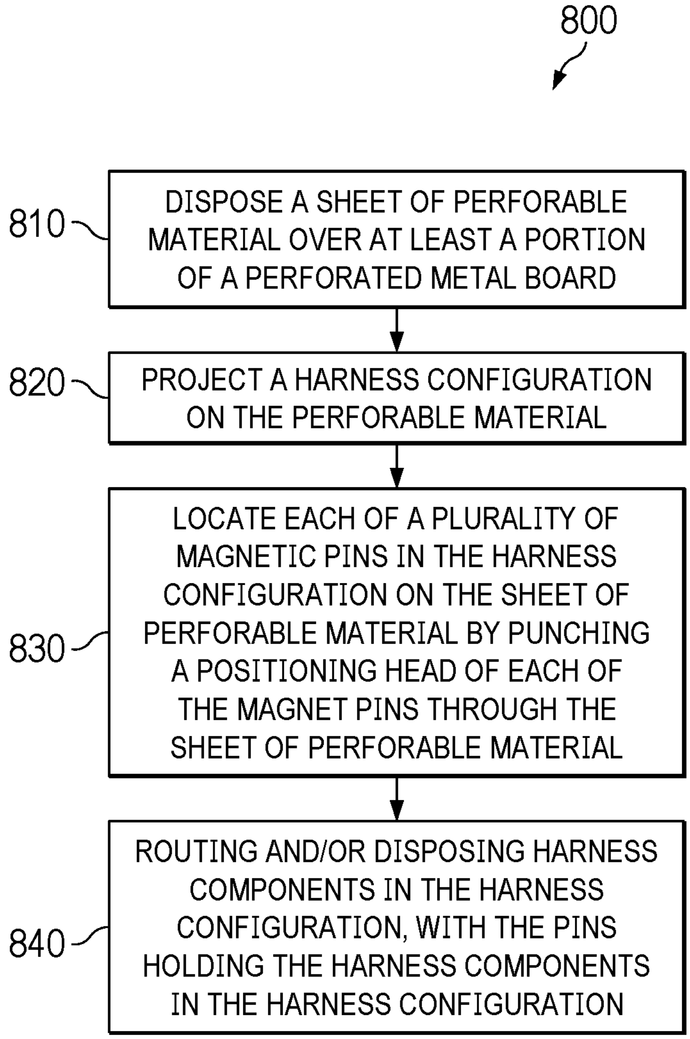
Figure 9A:
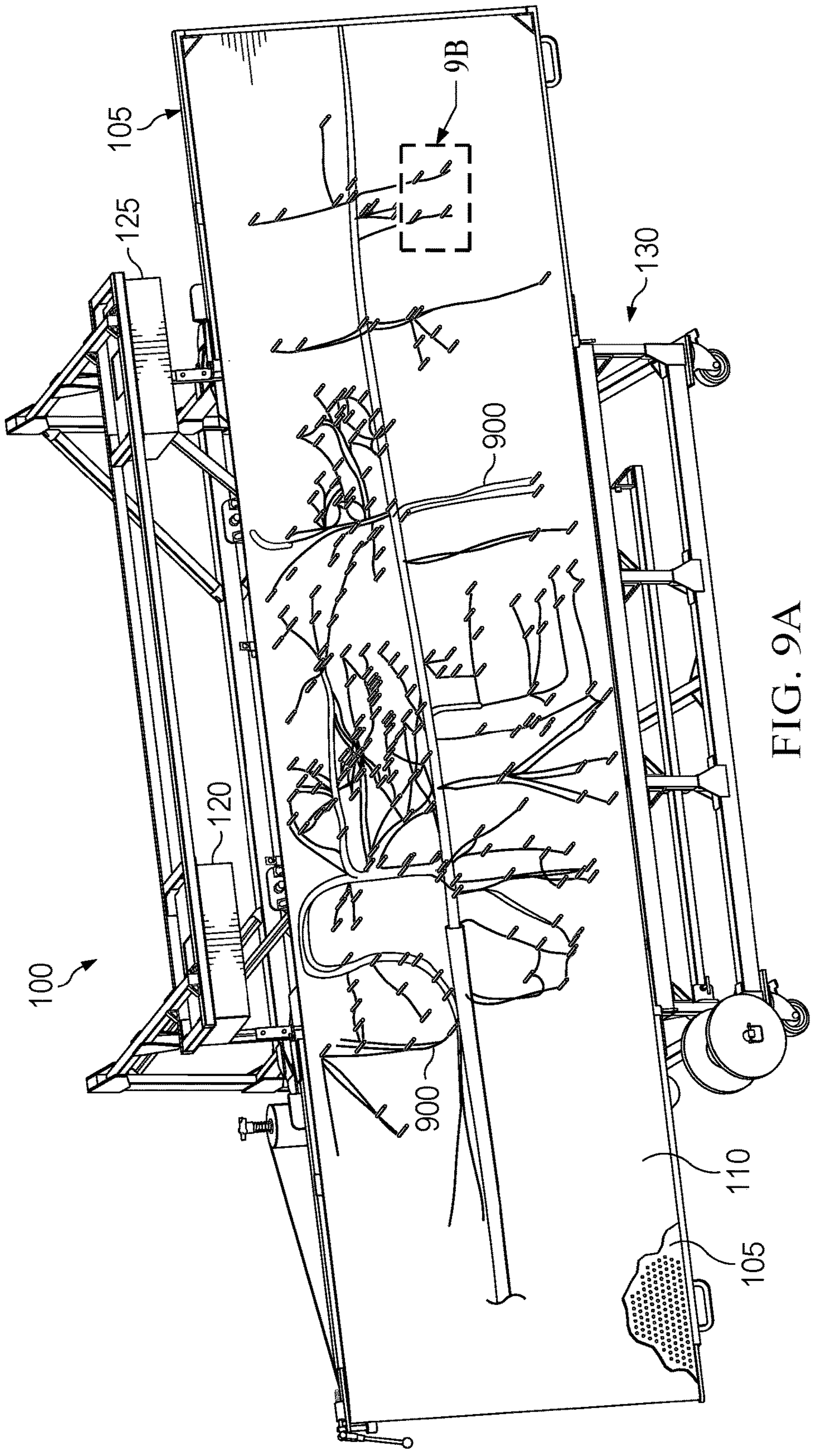
Figure 9B:
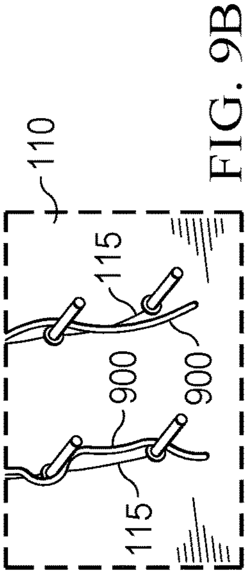
Figure 10:
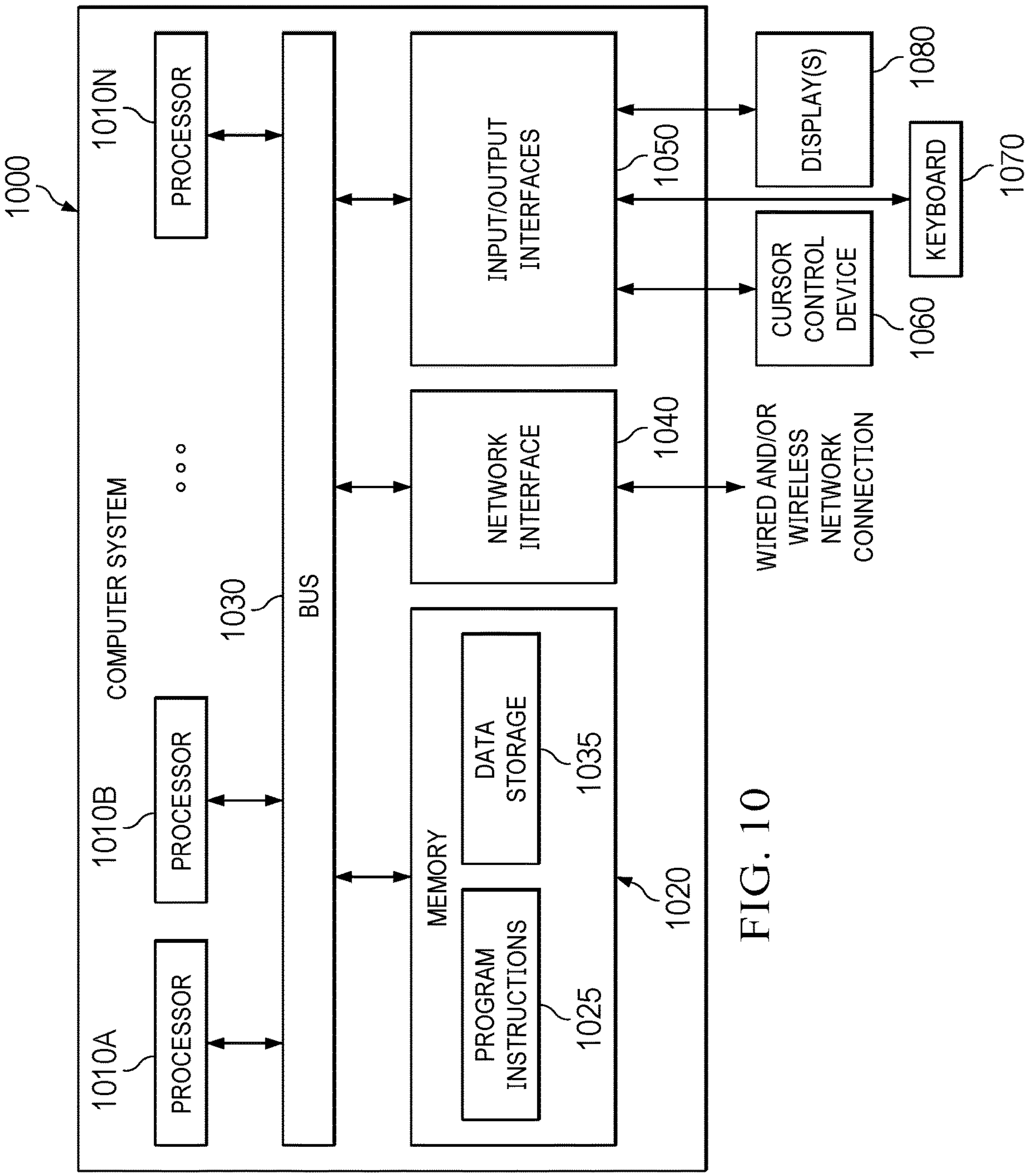

Having thus described the invention in general terms, reference will now be made to the accompanying drawings, which are not necessarily drawn to scale, and which are incorporated in and form part of the specification and in which like numerals designate like parts, illustrate embodiments of the present invention and together with the description, serve to explain the principles of the invention. In the drawings:

FIG. 1 is a diagrammatic perspective illustration of a portion of a (modular) rapid harness fabrication system, according to some embodiments;

FIG. 2 is diagrammatic perspective illustration of a portion of a fixed rapid harness fabrication system, according to some embodiments;

FIGS. 3 through 6 are diagrammatic perspective illustrations of rapid harness fabrication system magnetic pins, according to some embodiments;

FIG. 7 is a flowchart of a process for rapid fabrication of a harness, according to some embodiments;

FIG. 8 is a flowchart of another process for rapid fabrication of a harness, according to some other embodiments; and FIG. 9A is a diagrammatic illustration of a rapid harness fabrication system in use, employing rapid harness fabrication system magnetic pins from FIGS. 3 through 6, disposed/installed through perforable material disposed over the rapid harness fabrication system perforated metal board of FIG. 1, according to some embodiments, such as disclosed in FIG. 8;

FIG. 9B is a diagrammatic illustration of a portion of FIG. 9A, enlarged for magnification purposes, wherein a portion of wiring harness is shown routed in the harness configuration, according to the harness routing projected onto the sheet, with magnetic pins holding the harness components in the harness configuration, according to some embodiments, such as disclosed in FIG. 8; and FIG. 10 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word “may” is meant to convey a permissive sense (i.e., meaning “having the potential to”), rather than a mandatory sense (i.e., meaning “must”). Similarly, the words “include,” “including,” and “includes” mean “including, but not limited to.”

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, although embodiments of the present systems and methods may be described below with reference to a wiring harness, such as for a rotary wing and/or tiltrotor aircraft, embodiments of the present systems and methods may be applicable to various types of other harnesses such as hydraulic, vacuum, (pressurized) air, other fluids, or the like, as well as for other types of aircraft, such as fixed wing aircraft, or other implementations, etc. That is, embodiments of the present systems and methods may be used on any kind of production requiring a(n) (electrical) harness (typically) made by hand.

Thus, embodiments of the present systems and methods relate generally to wiring or other harnesses, and more particularly to rapid harness fabrication systems and methods, and specifically, in some embodiments, to rapid wiring harness fabrication systems and methods. In accordance with embodiments of the present systems and methods, as described in further detail below, rapid harness fabrication, in accordance herewith, uses pins having a positioning head, which may include (define) a paper punch end and a magnetic collar disposed between the positioning head and a shaft of the pin. A perforated metal board may have a sheet of perforable material (paper) disposed over it and the magnetic pins may be located in a harness configuration on the sheet by punching the positioning head of each of the pins through the sheet with the collar magnetically engaging the metal board. Harness components may be routed and/or disposed in the harness configuration, with the pins holding the harness components in the harness configuration. Stops secured to distal ends of pin shafts may retain a harness component in the harness configuration. The harness configuration may be projected on the sheet. at a one-to-one scale, by (a) system projector(s) and/or the harness routing may be printed on the sheet.

FIG. 1 is a diagrammatic perspective illustration of (a portion of) modular rapid harness fabrication system 100, showing rapid harness fabrication system perforated metal board 105. According to some embodiments, rapid (wiring) harness fabrication system 100 includes perforated metal board 105 and a plurality of magnetic pins 300, 400, 500, 600, and/or the like. FIGS. 2 through 5 are diagrammatic perspective illustrations of rapid harness fabrication system magnetic pins 300, 400, 500, 600, and/or the like. In accordance with first aspects of various embodiments of the present systems and methods, magnetic pins 300, 400, 500, 600, and/or the like, are used on perforated steel board 105. Rapid harness fabrication system 100 may further include, or otherwise make use of sheet, or sheets, of a perforable material 110 (shown in fragment in FIG. 1), such as paper, a perforable plastic sheet material, such as thin vinyl film, or the like, on which harness configuration 115 (also shown in fragment in FIG. 1) has been printed or (and) is projected, as described below.

In some embodiments of the present systems and methods, rapid harness fabrication system 100 may further include projector(s) 120 (and 125), which are configured to project wiring harness routing 115 on perforable material sheet 110 disposed over at least the portion of perforated metal board 105, with the perforable material (paper) sheet acting as a screen. In accordance with such embodiments the projector(s) project(s) the wiring harness routing on the perforable material sheet on the perforated metal board at a one-to-one scale, in other words, projecting the wiring harness routing on the perforable material sheet flat. For example, projector(s) 120 (and 125) may be disposed above, below or to one side of a plane of perforated metal board 105, and the projector may correct for parallax, to project the wiring harness routing on the perforable material sheet at such a one-to-one scale and (thereby) in a "flat" manner. Further in accordance with such embodiments of the present systems and methods, projector(s) 120 (and/or 125), and/or a computer system (not shown) coupled to the projector(s), may employ at least one processor and a memory coupled to the processor(s) having program instructions stored thereon that, upon execution by the one or more processors cause the projector to project the wiring harness routing on the perforable material disposed over at least the portion of the perforated metal board. As noted, this projection may be at the one-to-one scale, such as by correcting for parallax in accordance with the program instructions, to project the wiring harness routing on the perforable material disposed over at least the portion of the perforated metal board, flat, at the one-to-one scale.

Illustrated rapid harness fabrication system 100 in FIG. 1 is shown as "modular," in that rapid harness fabrication system perforated metal board 105 is mounted on mobile wheeled rack 130. However, in other embodiments a rapid harness fabrication system may be more permanent, such as mounted on a wall, or the like. For example, FIG. 2 is diagrammatic perspective illustration of (a portion of) fixed rapid harness fabrication system 200, according to some embodiments, showing generally fixed perforated metal board 105. In either embodiment, 100 or 200, a roll (230) of the perforable material (e.g., paper, perforable plastic sheet material (such as thin vinyl film, or the like) 110 may be disposed on a roller or in roller rack 235, such as shown in FIG. 2, or the like, rollably mounting sheet roll 230 at one end of perforated metal board 105, for being disposed over at least a portion of the perforated metal board.

Fixed rapid harness fabrication system configuration 200 may be well adapted for fabrication of larger harnesses. As such fixed rapid harness fabrication system 200 may also include a number of projector(s) 220*a*-*n*, or the like, which may also be configured to, together, project a wiring harness routing (115) on perforable material sheet 110 disposed over at least a portion of perforated metal board 105, with the perforable material (paper) sheet acting as a screen. In accordance with such embodiments the projector(s) project(s) the wiring harness routing on the perforable material sheet on the perforated metal board at a one-to-one scale, flat, such as through correction of parallax. As described above, projectors 220*a*-*n* may, as shown, be disposed above, or in other embodiments, below or to one side of, a plane of perforated metal board 105, and the projectors may (together) correct for parallax, to project the wiring harness routing on the perforable material sheet at such a one-to-one scale and (thereby) in a "flat" manner. Also, in accordance with such embodiments of the present systems and methods, projectors 220*a*-*n*, and/or a computer system (not shown) coupled to the projectors, may employ at least one processor and a memory coupled to the processor(s) having program instructions stored thereon that, upon execution by the one or more processors cause the projector to project the wiring harness routing on the perforable material disposed over at least the portion of the perforated metal board, at the one-to-one scale, such as by correcting for parallax in accordance with the program instructions, to project the wiring harness routing on the perforable material disposed over at least the portion of the perforated metal board, flat, at the one-to-one scale.

Each rapid harness fabrication system magnetic pin 300, 400, 500, 600, and/or the like includes positioning head 305, 405, 505 or 605 and magnetic (e.g., magnet) collar 310, 410, 510 or 610. The magnetic collar is secured, or otherwise disposed, between the respective positioning head and shaft (i.e., body) 315, 415, 515 or 615 of the respective pin. The respective magnetic collar 310, 410, 510 or 610 may be secured by inference fit of the magnetic color on the respective pin shaft 315, 415, 515 or 615. The shaft 315, 415, 515 or 615 of each respective pin may be a rod or the like, which may be made of stainless steel, or the like, and may be non-magnetic, in accordance with some embodiments. Each of positioning heads 305, 405, 505 or 605 may form, or otherwise define, a "paper punch" end. For example, the lower end face of each positioning head may define (i.e., be shaped as) a shallow, sharp-edged "V," or the like, to define a cylindrically-shaped hole-punching "blade," or the like, that facilitates punching of the positioning head through the perforable sheet. Each rapid harness fabrication system magnetic pin 300, 400, 500, 600, and/or the like, may, in some embodiments, also include a (removable) wire stop (per) secured to a distal end of the shaft from the positioning head and magnetic collar. For example, in illustrated longer rapid harness fabrication system magnetic pins 500 and 600, for larger harnesses, respective wire "stoppers" (or "stops") 520 and 620 are shown secured, by respective cap screws 525 and 625, to respective distal ends 530 and 630 of respective shaft 515 and 615 from respective positioning head 505 and 605 and magnetic collar 510 and 610. Hence, respective wire stoppers 520 and 620 may be removable, by unthreading the respective cap screw 525 or 625 and removing the stopper (and replacing the cap screw, if desired).

In accordance with the discussion below, pins 300, 400, 500, 600, and/or the like are located on perforated panel 105 using positioning heads 305, 405, 505 or 605, below the magnets 310, 510, 510 or 610. As noted, different configurations and/or sizes of pins 300, 400, 500, 600, and/or the like may be used, in accordance with embodiments of the present systems and methods, such as to accommodate different sizes of harnesses to be manufactured. Magnetic pin 300, 400, 500, 600, or the like, is as discussed below, located by an operator, without usage of (a) (special) tool(s), may be held in place, not only by fit of positioning head 305, 405, 505 or 605, but also by magnetic collar 310, 510, 510 or 610, but can be easily removed, as needed (such as during harness fabrication).

As also discussed below, magnetic pins 300, 400, 500, 600, and/or the like, may be used, in accordance with embodiments of the present systems and methods, with two different manufacturing processes, printed harness routing (FIG. 7) or (and) projected harness routing (FIG. 8). Thus, in accordance with embodiments of the present systems and methods, magnetic collars of larger pins, such as magnetic collars 510 and 610 of larger pins 500 and 600, may be larger than other collars (310 and/or 510) to provide a stiffer base, for example, such as through a larger bearing area against board 105, for these larger pins.

FIG. 7 is a flowchart of process 700 for rapid fabrication of a harness, according to some embodiments. Therein, in use, the rapid harness fabrication system (100 or 200) may, as discussed use a sheet, or sheets, of a perforable material (110), such as paper, a perforable plastic sheet material (such as thin vinyl film), or the like, upon which a harness configuration has been printed at 710. The perforable sheet with the wiring harness printed on it is disposed over at least a portion of the perforated metal board (105 or 805), at 720. Further in accordance with process 700, a plurality of magnetic pins 300, 400, 500, 600, and/or the like, are located, at 730, in the harness configuration on the sheet of perforable material, according to the harness routing (115) printed on the sheet, such as by punching a (paper punch) positioning head 305, 405, 505, 605, or the like, of each magnet pin through the sheet. Then at 740 of process 700, harness components are routed, and/or otherwise disposed in the harness configuration, according to the harness routing (115) printed on the sheet (110), with each of the plurality of magnetic pins 300, 400, 500, 600, and/or the like disposed in the harness configuration, holding the harness components in the harness configuration. As noted above, longer rapid harness fabrication system magnetic pins 500 and 600, with respective wire stoppers 520 and 620, or the like, may be used, at 730 for larger harnesses, or in harness positions where the harness is larger (e.g., includes more wires, larger components, or the like) with respective wire stoppers 520 and 620 further retaining or holding the harness components in the harness configuration at 740.

FIG. 8 is a flowchart of another (e.g., an alternative) process 800 for rapid fabrication of a harness, according to some embodiments. Therein, in use, rapid harness fabrication system 100 may also further include a sheet, or sheets, of a perforable material (110), such as paper, a perforable plastic sheet material (such as thin vinyl film), or the like, being disposed over at least a portion of perforated metal board 105, at 810 of process 800. Further in accordance with process 800, rapid harness fabrication system 100 may further include projector(s) (120 (and 125)) which project(s), at 820 of process 800, wiring harness routing 120 on perforable material sheet 110 disposed over at least the portion of the perforated metal board, with the perforable material (paper) sheet acting as a screen. As discussed, in such embodiments, the projector projects the wiring harness routing on the perforable material sheet of the perforated metal board at a one-to-one scale. For example, projector(s) 120 (and 125) may be disposed above, below or to one side of (a plane of) perforated metal board 105, and the projector may correct for parallax, to project the wiring harness routing on the perforable material sheet at such a one-to-one scale and (thereby) in a “flat” manner (scale). Further in accordance with embodiments of the present systems and methods, projector(s) 120 (and/or 125), and/or a computer system coupled to the projector(s), may employ at least one processor and a memory coupled to the processor(s) having program instructions stored thereon that, upon execution by the one or more processors cause the projector to project the wiring harness routing on the perforable material disposed over at least the portion of the perforated metal board at the one-to-one scale, such as by correcting for parallax, to project the wiring harness routing on the perforable material disposed over at least the portion of the perforated metal board flat, at the one-to-one scale.

In such embodiments, a plurality of magnetic pins 300, 400, 500, 600, and/or the like, are located, at 830 of process 800, in a harness configuration on the sheet of perforable material, according to harness routing 120 projected onto the sheet, such as by punching a (paper punch) positioning head 305, 405, 505, 605, or the like, of each magnet pin through the sheet. Then at 840 of process 800, harness components are routed, and/or otherwise disposed in the harness configuration, according to harness routing 115 projected onto sheet 110, with each of the plurality of magnetic pins 300, 400, 500, 600, and/or the like disposed in the harness configuration, holding the harness components in the harness configuration. Again, as noted above, longer rapid harness fabrication system magnetic pins 500 and 600, with respective wire stoppers 520 and 620, or the like, may be used, at 830 for larger harnesses, or in harness positions where the harness is larger (e.g., includes more wires, larger components, or the like) with respective wire stoppers 520 and 620 further retaining or holding the harness components in the harness configuration at 840.

FIG. 9A is a diagrammatic illustration of a rapid harness fabrication system, such as modular rapid harness fabrication system 100, in use, employing rapid harness fabrication system magnetic pins 300 through 600 from FIGS. 3 through 6. The pins are shown disposed/installed through perforable material 110 disposed over rapid harness fabrication system perforated metal board 105 of FIG. 1, according to some embodiments, such as disclosed in FIG. 8. Whereby, wiring harness 900 is constructed in accordance with, by way of example, process 800, as described above. To wit, FIG. 9B is a diagrammatic illustration of a portion of FIG. 9A, enlarged for magnification purposes, wherein a portion of wiring harness 900 is shown routed in the harness configuration 115, according to the harness routing projected onto the sheet 110, with magnetic pins holding the harness components in the harness configuration.

In accordance with the foregoing, embodiments of the present systems and methods provide flexibility through use of magnetic pins directly by the operator, not requiring specials tools, such as required for completing additional steps to build existing plywood wiring harness boards. Further, embodiments of the present systems and methods alleviate any need to manipulate heavy plywood to make, set-up or change harness configurations. Embodiments of the present systems and methods, provide flexibility to use a modular set-up to save significantly on square footage, such as through use of an eight to sixteen foot modular rapid harness fabrication system, such as illustrated in FIG. 1. Also, in accordance with the foregoing, the is no need to store unused boards, or the like. In accordance with embodiments of the present systems and methods, the magnetic pins are just removed from the perforated steel board and the following harness is then built on the same board (105). If a printed harness routing was used, just the print needs to be stored to preserve the harness layout for future usage (not an entire (set of) plywood board(s)).

Even with projected harnesses, the perforated paper may be preserved to facilitate rapid further layout of a harness configuration, such as by disposing this already-perforated sheet on the board, aligned with the projected harness showing the placement of components. Regardless, a projected harness configuration resides on, and is therefore saved on, a drive of the projector(s), or attached computer, and thereby, easily accessible by one operator to produce a harness (in the future). That is, in accordance with the foregoing, there is no need to wait for plywood harness layout boards to be fabricated by a tooling department, or the like. An operator can project or print the harness routing and is ready to start the harness fabrication. Experience has shown that this enables an operator to start new harness fabrication five times faster (i.e., in one fifth the time) compared to conventional processes during development or prototyping phases for harnesses. Further, significant time savings, such as during development or prototyping phases, include fast engineering change incorporation, through use of the present rapid harness fabrication systems and methods. Thus, implementation of embodiments of the present systems and methods provide low-cost solutions by using existing harness routing data, developed over time, and a straightforward approach though the above described use of magnetic pins.

Portions of embodiments of the present systems and methods for rapid (wiring) harness fabrication, as described herein, may be implemented at least in part as, or executed, at least in part, by one or more computer systems. One such computer system is illustrated in FIG. 10. In various embodiments, computer system 1000 may be a server, a mainframe computer system, a workstation, a network computer, a desktop computer, a laptop, a tablet computing device, a smartphone, or the like, which may be coupled to projector(s) 120 (and 125). In various (other) embodiments computer system 1000, or some components thereof, may be implemented as a part of projector(s) 120 (and 125). For example, in some cases, computer 1000, or components thereof incorporated into projector(s) 120 (and 125), may implement step 820 of process 800, described above with respect to FIG. 8, including, bay way of example both projection of the wiring harness, but also parallax correction, or the like, to project the wiring harness routing on the perforable material sheet at such a one-to-one scale and (thereby) in a "flat" manner. In various embodiments computer system 1000, or the like, may be configured to communicate with, by way of example projector(s) 120 (and 125) in any suitable way, such as, for example, via a (local or public) network and/or 230, which may be the Internet, a local area network, direct connection, or the like, using wired or wireless functionality, etc.

As illustrated, computer system 1000 includes one or more processors 1010A-N coupled to a system memory 1020 via bus 1030. Computer system 1000 further includes a network interface 1040 coupled to bus 1030, and one or more I/O controllers 1050, which in turn are coupled to peripheral devices such as cursor control device 1060, keyboard 1070, display(s) 1080, etc. Each of I/O devices 1060, 1070, 1080 may be capable of communicating with I/O controllers 1050, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 1000 may be a single-processor system including one processor 1010A, or a multi-processor system including two or more processors 1010A-N (e.g., two, four, eight, or another suitable number). Processors 1010 may be any processor capable of executing program instructions. For example, in various embodiments, processors 1010 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 1010 may commonly, but not necessarily, implement the same ISA. Also, in some embodiments, at least one processor 1010 may be a graphics processing unit (GPU) or another dedicated graphics-rendering device.

System memory 1020 may be configured to store program instructions and/or data accessible by processor 1010. In various embodiments, system memory 1020 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 1020 as program instructions 1025 and data storage 1035, respectively. In other embodiments, program instructions and/or data may be received, sent, or stored upon different types of computer-accessible media or on similar media separate from system memory 1020 or computer system 1000.

A computer-accessible medium may include any tangible and/or non-transitory storage media or memory media such as electronic, magnetic, or optical media—e.g., disk or CD/DVD-ROM coupled to computer system 1000 via bus 1030. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 1030 may be configured to coordinate I/O traffic between processor 1010, system memory 1020, and any peripheral devices in the computer system, including network interface 1040 or other peripheral interfaces, such as I/O devices 1060, 1070, 1080. In some embodiments, bus 1030 may perform any necessary protocol, timing, or other data transformations to convert data signals from one component (e.g., system memory 1020) into a format suitable for use by another component (e.g., processor 1010). In some embodiments, bus 1030 may include support for devices attached through various types of peripheral buses, such as a variant of the Peripheral Component Interconnect (PCI) bus standard or the Universal Serial Bus (USB) standard, for example. In some embodiments, the function of bus 1030 may be split into two or more separate components, such as a northbridge chipset and a southbridge chipset, for example. In addition, in some embodiments some or all the functionality of bus 1030, such as an interface to system memory 1020, may be incorporated directly into processor(s) 1010A-N.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 1050 may, in some embodiments, enable communications with one or more display terminals, keyboards, keypads, touchpads, scanning devices, voice or optical recognition devices, mobile devices, or any other devices suitable for entering or retrieving data by one or more computer system 1000. Multiple I/O controllers 1050 may be present in computer system 1000 or may be distributed on various nodes of computer system 1000. In some embodiments, I/O devices may be separate from computer system 1000 and may interact with one or more nodes of computer system 1000 through a wired or wireless connection, such as over network interface 1040.

As shown in FIG. 10, system memory 1020 may include program instructions 1025, configured to implement certain embodiments described herein, and data storage 1035, comprising various data may be accessible by program instructions 1025. In an embodiment, program instructions 1025 may include software elements, which may be configured to affect the operations discussed in FIGS. 1 through 4. Program instructions 1025 may be implemented in various embodiments using any desired programming language, scripting language, or combination of programming languages and/or scripting languages (e.g., C, C++, C #, JAVA®, JAVASCRIPT®, PERL®, etc.). Data storage 1035 may include data that may be used in these embodiments (e.g., recorded communications, profiles for different modes of operations, etc.). In other embodiments, other or different software elements and data may be included.

A person of ordinary skill in the art will appreciate that computer system 1000 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Figure 6:
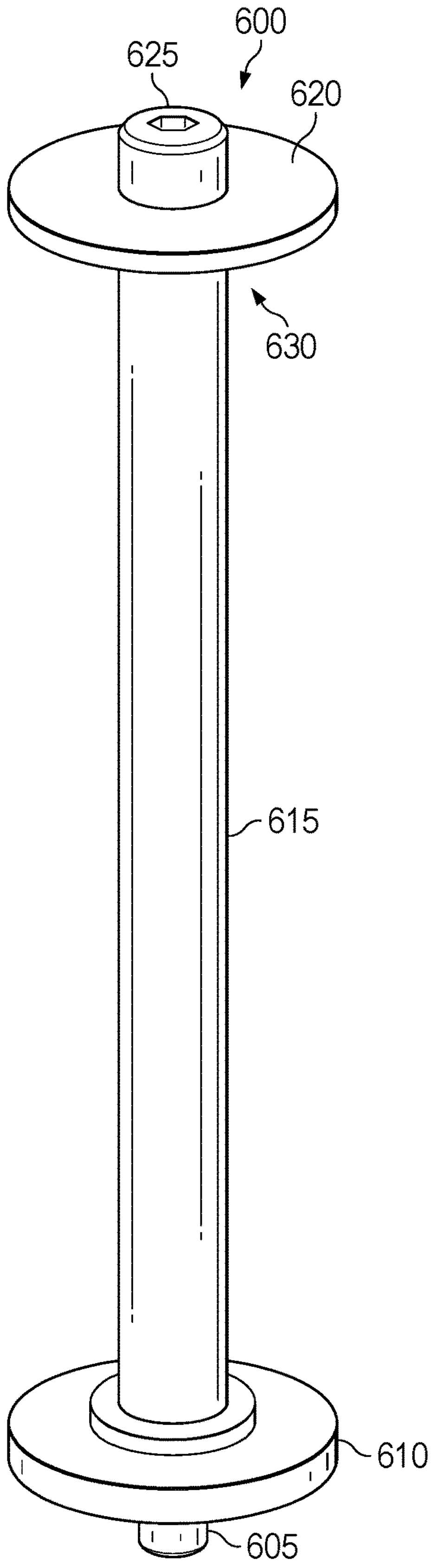

In various embodiments, computer system 1000 may not include each of the components shown in FIG. 10. 6. Additionally, or alternatively, computer system 1000 may include various additional components in addition to those that are shown in FIG. 6. Furthermore, some components that are represented as separate components in FIG. 10 may in certain embodiments instead be integrated with other components. For example, in certain embodiments, all or a portion of the functionality provided by the illustrated components may instead be provided by components integrated into the one or more processor(s) 1010 as a System on a Chip (SoC). Such that, in such an example, projector(s) 120 (and 125), in certain embodiments of the present systems and methods, may include such a SoC, or the like, that may be used to provide the parallax correction, or the like, of the “one-to-one” (flat) projection of harness 115.

The various operations described herein, particularly in connection with FIGS. 1 through 10, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

For example, various elements of the present rapid (wire) harness fabrication systems and methods, such as, by way of example projection of the wiring harness, and/or parallax correction, or the like, thereof to project the wiring harness routing on the perforable material sheet at a one-to-one scale and (thereby) in a “flat” manner, may be implemented as one or more modules. Modules may be implemented in hardware, such as in projector(s) 120 (and 125). In some embodiments, modules may be expressed in software executed by hardware, such as computer system 1000, or some components thereof implemented as a part of projector(s) 120 (and 125). In still other embodiments, modules may be implemented in firmware operated by hardware. In still other embodiments, modules may be implemented in combinations of hardware, software, and/or firmware.

Computer-based environment components may include programing and/or hardware to implement embodiments of the present systems and methods. This programming may take the form of stored program instructions, programed firmware, or the like, while hardware might take the form of an Application Specific Integrated Circuit (ASIC), digital signal processor, graphics processing unit, SoC, or the like, such as implemented as a part of projector(s) 120 (and 125), to carry out such aspects of embodiments of the present systems and methods.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the “C” programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, such as, herein, on projector(s) 120 (and 125), to produce a computer implemented process (step(s)) such that the instructions upon execution provide processes for implementing the operations specified in the block diagram block or blocks.

Reference may be made herein to “configuring” a device or a device “configured to” perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

The terms “tangible” and “non-transitory,” such as may be used herein, are intended to describe a computer-readable storage medium (or “memory”) excluding propagating electromagnetic signals; but are not intended to otherwise limit the type of physical computer-readable storage device that is encompassed by the phrase computer-readable medium or memory. For instance, the terms “non-transitory computer readable medium” or “tangible memory” are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as “first” and “second” are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A rapid harness fabrication pin comprising:

a positioning head and a magnetic collar, the magnetic collar disposed between the positioning head and a shaft of the pin; and a stop secured to a distal end of the shaft from the positioning head and magnetic collar, wherein the stop is configured to hold a component of a harness in a position between the stop and the magnetic collar.

2. The rapid harness fabrication pin of claim 1, wherein the stop is disk-shaped.

3. A rapid harness fabrication system comprising:

a perforated metal board;

a sheet of perforable material disposed over at least a portion of the perforated metal board;

a projector, the projector configured to project a wiring harness routing on the perforable material disposed over at least the portion of the perforated metal board; and a plurality of magnetic pins, each pin comprising:

a positioning head and a magnetic collar, the magnetic collar disposed between the positioning head and a shaft of the pin;

wherein the projector, or a computer system coupled to the projector, further comprises:

at least one processor; and a memory coupled to the at least one processor and having program instructions stored thereon that, upon execution by the one or more processors cause the projector and/or the computer system to correct for parallax, to project the wiring harness routing on the perforable material disposed over at least the portion of the perforated metal board at a one-to-one scale.

4. The system of claim 3, wherein the positioning head comprises a paper punch end.

5. The system of claim 3, wherein the projector is disposed above, below or to one side of the perforated metal board.

6. The system of claim 3, wherein each pin further comprises a stop secured to a distal end of the shaft from the positioning head and magnetic collar, and wherein the stop is configured to hold a component of a harness in a position between the stop and the magnetic collar.

7. The system of claim 6, wherein the stop is disk-shaped.

8. A rapid harness fabrication system comprising:

a perforated metal board;

a sheet of perforable material disposed over at least a portion of the perforated metal board; and a plurality of magnetic pins, each pin comprising:

a positioning head; and a magnetic collar, the magnetic collar disposed between the positioning head and a shaft of the pin, wherein the magnetic collar comprises a magnetic portion that is circular and concentric about a longitudinal axis of the shaft, and wherein the magnetic collar is configured to magnetically engage the perforated metal board via the magnetic portion while at least a portion of the perforable material is disposed between the magnetic collar and the perforated metal board.

9. The system of claim 8, wherein the sheet of perforable material disposed over at least the portion of the perforated metal board further comprises harness routing printed on the sheet of perforable material disposed over at least the portion of the perforated metal board.

10. The system of claim 8, wherein the positioning head does not move relative to the collar and shaft.

11. The system of claim 8, wherein the positioning head comprises a paper punch end.

* * * * *